United States Patent [19]
Fukui et al.

[11] Patent Number: 5,368,368
[45] Date of Patent: Nov. 29, 1994

[54] VEHICLE SEAT AND METHOD OF PRODUCTION THEREOF

[75] Inventors: Akio Fukui, Toyota; Yasuji Shibata, Aichi, both of Japan

[73] Assignee: Toyoda Jidosha Kabushiki Kaisha, Toyota, Japan

[21] Appl. No.: 879,205

[22] Filed: May 6, 1992

[30] Foreign Application Priority Data

May 13, 1991 [JP] Japan .................. 3-107233

[51] Int. Cl.⁵ .............................. A47C 7/02
[52] U.S. Cl. ............... 297/452.18; 297/452.49; 297/452.64
[58] Field of Search ............ 297/452.18, 452.52, 297/452.55, 452.49, 452.64

[56] References Cited

U.S. PATENT DOCUMENTS

| | | | |
|---|---|---|---|
| 1,876,101 | 9/1932 | Thum | 297/452.49 |
| 2,029,247 | 1/1936 | Mercogliano | 297/452.49 X |
| 2,568,071 | 9/1951 | Johnson . | |
| 2,982,342 | 5/1961 | Liljengren . | |
| 3,039,763 | 6/1962 | Staples et al. | 297/452.52 X |
| 3,107,944 | 10/1963 | Baerman | 297/452.64 X |
| 3,560,049 | 2/1971 | Burton | 297/452.52 X |
| 3,610,688 | 10/1971 | Arnold | 297/452.49 |
| 4,060,280 | 11/1977 | Van Loo | 297/452.55 X |
| 4,309,058 | 1/1982 | Barley | 297/452.52 X |
| 4,458,943 | 7/1984 | Krakauer | 297/452.52 X |
| 4,883,320 | 11/1989 | Izumida et al. . | |
| 4,939,183 | 7/1990 | Abu-Isa et al. . | |
| 5,009,827 | 4/1991 | Abu-Isa et al. . | |
| 5,044,693 | 9/1991 | Yokota | 297/452.18 |

FOREIGN PATENT DOCUMENTS

| | | | |
|---|---|---|---|
| 693712 | 9/1964 | Canada | 297/452.52 |
| 1261913 | 4/1961 | France | 297/452.52 |
| 1654287 | 3/1971 | Germany | 297/452.55 |
| 61-60760 | 4/1986 | Japan . | |
| 61-107341 | 7/1986 | Japan . | |
| 61-160751 | 10/1986 | Japan . | |
| 61-172560 | 10/1986 | Japan . | |
| 62-128460 | 8/1987 | Japan . | |
| 62-171961 | 10/1987 | Japan . | |
| 63-17652 | 2/1988 | Japan . | |
| 64-14053 | 1/1989 | Japan . | |
| 2111346 | 9/1990 | Japan . | |
| 138281 | 5/1930 | Switzerland | 297/452.49 |

*Primary Examiner*—Peter M. Cuomo
*Assistant Examiner*—Suzanne L. Dino
*Attorney, Agent, or Firm*—Cushman, Darby & Cushman

[57] ABSTRACT

End portions of elastic fibers are fixed to a holder plate as well as a holder cover constituting a seat surface of a vehicle seat, thereby spanning the elastic fibers. A net-shaped seat portion is thus formed of the elastic fibers. The holder plate and the holder cover are suspended on the elastic fibers in the upper-diagonal direction. The elastic fibers thus strained are overlaid with urethane foam, and a cushion member is formed by a urethane pad. Meanwhile, the holder cover is pulled by a spring in the lower-diagonal direction so as to impart an initial tensile force to the elastic fibers, whereby deflections are eliminated. When an occupant's weight acts on the vehicle seat with the above construction, the vehicle seat deflects downward, with a predetermined deflection curve being drawn. However, both end portions of the elastic fibers are suspended on the elastic fibers in the upper-diagonal direction. This provides a substantially linear deflection curve, and a feeling of sitting-on-the-bottom is eliminated. The elastic fibers and the urethane pad can be formed integrally by means of a mold, thereby allowing a shorter manufacturing process.

16 Claims, 10 Drawing Sheets

_5,368,368_

VEHICLE SEAT AND METHOD OF PRODUCTION THEREOF

BACKGROUND OF THE INVENTION

1. Field of the Invention

The present invention relates to a vehicle seat and a method of production thereof.

2. Description of the Related Art

Vital cushion characteristics of a vehicle seat are a proper degree of flexibility, strength enough to carry a load, and durability.

In order to insure such cushion characteristics, conventional vehicle seats have been made up of: a seat frame formed of steel pipe and the like; a spring member such as a urethane pad and a S-shaped spring, which is mounted to the seat frame; and, a covering material such as tricot, moquette, and woven fabrics, which surrounds the surface of the seat frame and the spring member.

However, the spring member formed of the urethane pad, the S-shaped spring and the like requires a large amount of urethane foam, which makes savings in manufacturing costs of the vehicle seat difficult to achieve.

As shown in FIG. 11, a vehicle seat 100 has been proposed for solving this problem (Japanese Utility Model Application Laid-Open No. 61-172560). In the vehicle seat 100, a seat frame 102 is provided with elastic fibers 104 which are spanned in the form of cross stripes. Urethane foam 106 is then integrally overlaid on both upper and lower surfaces of the elastic fibers 104. The elastic fibers 104 acting as a spring layer and the urethane foam 106 acting as a cushion layer are integrally formed into the vehicle seat 100. Therefore, a proper degree of flexibility is thereby expected. In addition, the vehicle seat with a simplified structure and the use of the urethane foam 106 in a reduced amount can be attained.

However, in the above vehicle seat 100, the elastic fibers 104 are spanned in a flat plane with respect to the surface of the seat frame 102. Accordingly, a non-linear deflection curve is drawn in which the amount of deflection in the elastic fibers 104 relative to a load is greatest immediately when the elastic fibers 104 receives a load, and thereafter reduces gradually. (See a solid line in FIG. 9.)

As a result, with this vehicle seat 100, a so-called feeling of sitting-on-the-bottom occurs (by which is meant a feeling of being seated in the bottom of the seat due to unsteady variations of deflections).

SUMMARY OF THE INVENTION

In view of the above-described fact, an object of the present invention is to provide both a vehicle seat designed to eliminate a so-called feeling of sitting-on-the-bottom and a method for producing the vehicle seat which allows for fewer components and a shorter manufacturing process.

The vehicle seat according to the present invention comprises: a holding member which forms a seat surface for an occupant; an elastic material of which an end portion is secured to the holding member, thereby spanning the elastic material; an elastic suspending means that suspends the holding member from a central portion thereof in the upper-diagonal and outward direction relative to the seat surface formed by the holding member; a urethane pad integrally overlays the holding member, the elastic material, and the elastic suspending means; and, a tension means that strains the holding member from a central portion thereof in the lower-diagonal and outward direction relative to the seat surface formed by the holding member.

According to the present invention, the method for producing the vehicle seat comprises: a first process comprising the mounting of the holding member and an outer frame, which is disposed on the outer periphery of the holding member so as to constitute the elastic suspending means, to a mold which forms a cushion member for the vehicle seat; a second process comprising the spanning of the elastic material between the outer frame and the holding member so as to form the elastic suspending means; a third process comprising the spanning of the elastic material between the holding members in the form of a net; and, a fourth process including injecting urethane foam into the mold.

In the vehicle seat with the above construction, the urethane pad is integrally overlaid with: the elastic material spanned between the holding members; and, the elastic suspending mean that suspends the holding member in the upper-diagonal direction. The seat surface of the vehicle seat is thereby formed.

When an occupant's weight acts on the seat surface, the elastic material deflects downward, with a predetermined deflection curve being drawn. At this time, one end of the elastic member is suspended by the elastic suspending means through the holding member. This elastic suspending means imparts a predetermined tensile force to the holding member from the central portion of the holding member in an upper-diagonal and outward direction, whereby the elastic material is suspended. This provides a substantially linear deflection curve of the elastic material, and a feeling of sitting-on-the-bottom is eliminated, as compared with the elastic material spanned in a flat plane. The holding member, in which the elastic material is fixed, is also strained by the tension means from the central portion of the holding member in the lower-diagonal and outward direction. An initial tensile force is thereby imparted to the elastic material. As a result, an initial deflection acting downward is eliminated, and the elastic material is prevented from leaving the holding member when a fixed portion of the elastic material is pulled upward.

In the method for producing the vehicle seat, the holding member and the outer frame, which is disposed on the outer periphery of the holding member so as to constitute the elastic suspending means, are mounted into the mold forming the cushion member for the vehicle seat. The elastic material is then spanned between the outer frame and the holding member so as to form the elastic suspending means. The other elastic material is spanned between the holding members in the form of a net. Subsequently, a covering material is applied or fitted to the mold, into which urethane foam is injected, whereby the elastic material and the holding member are integrally formed with the urethane pad. In this way, a one-piece body is formed with the elastic material acting as a spring member, the urethane pad acting as the cushion member, and the covering material. This allows for fewer components and a shorter manufacturing process.

DESCRIPTION OF THE PREFERRED EMBODIMENTS

Figure 1:
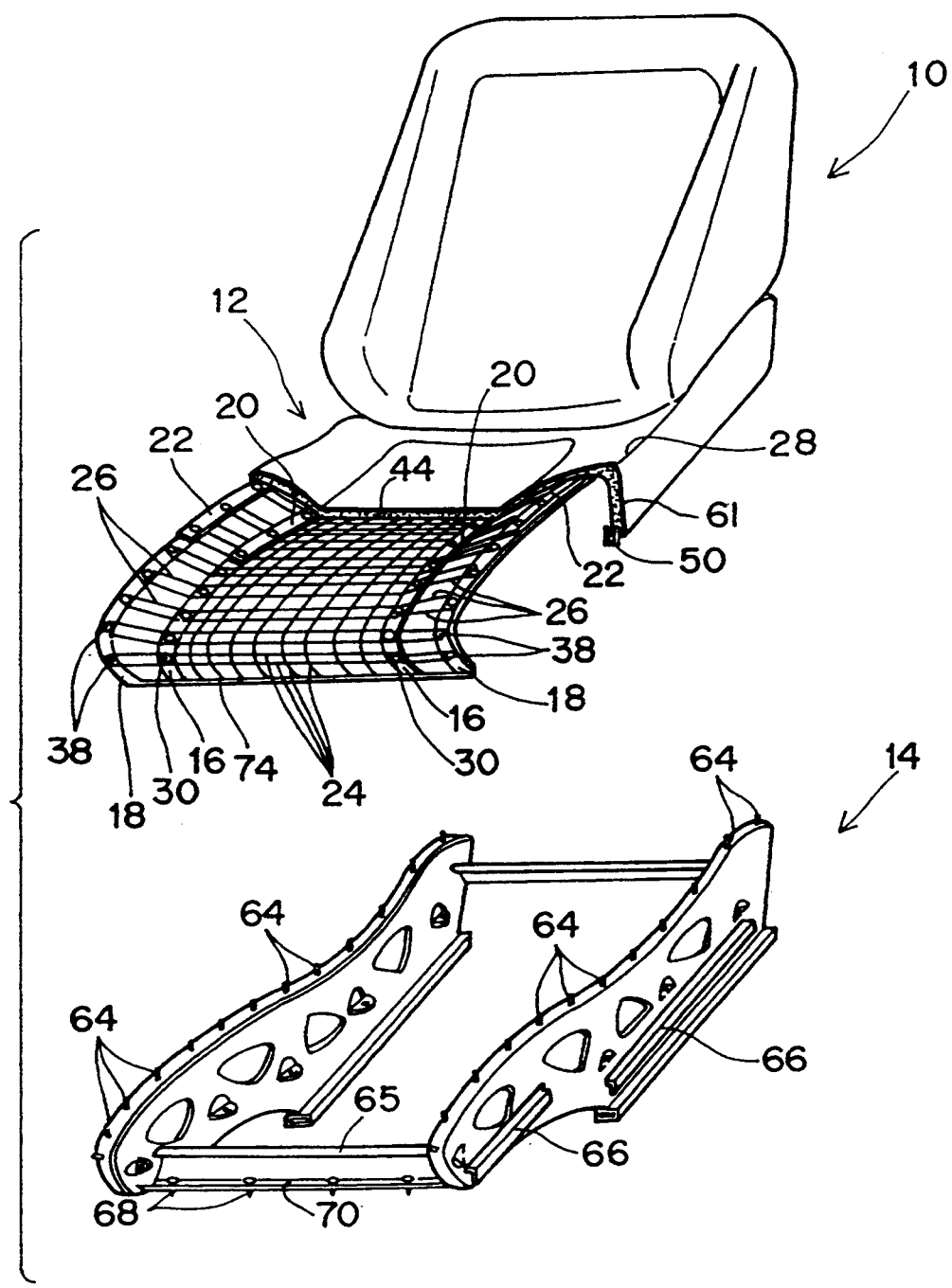
FIG. 1 is a partially broken, general perspective view showing a vehicle seat and a seat frame according to the present invention.

FIG. 1 shows a cushion member 12 and a seat frame 14 for a vehicle seat 10 according to the present invention.

Construction of the Cushion Member

A cushion member 12 is formed of: elastic fibers 24 and 26, of which end portions are held both between holder plates 16 and holder covers 20 and between holder plates 18 and holder covers 22 so as to span the elastic fibers 24 and 26 into the form of a net; and, a urethane pad 44 and a covering material 61 which are together combined with the former components so as to form a seat portion.

The holder plates 16 constitute an outer frame of the seat portion. On the outer periphery of the holder plates 16, holder plates 18 are disposed to form banked portions 28 of the cushion member 12. When curvature of the buttocks of a seated occupant is taken into account, the holder plates 16 and 18 are flexed at a given curvature in the longitudinal direction of a vehicle.

Figure 2:
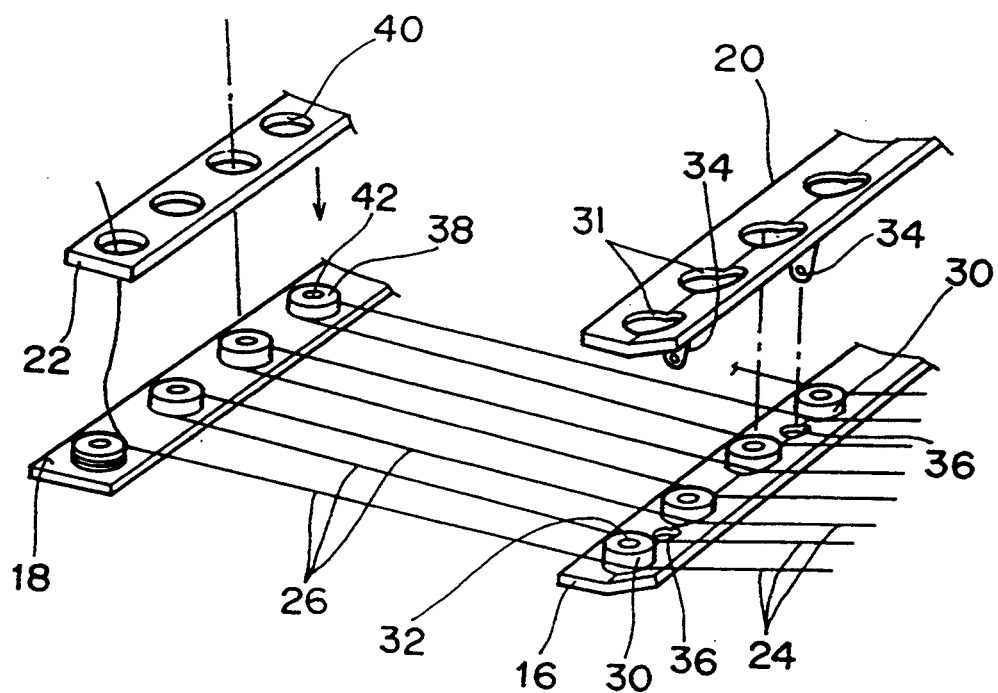
FIG. 2 is a perspective view showing a portion where elastic fibers in the vehicle seat according to the present invention are wound.
Figure 5:
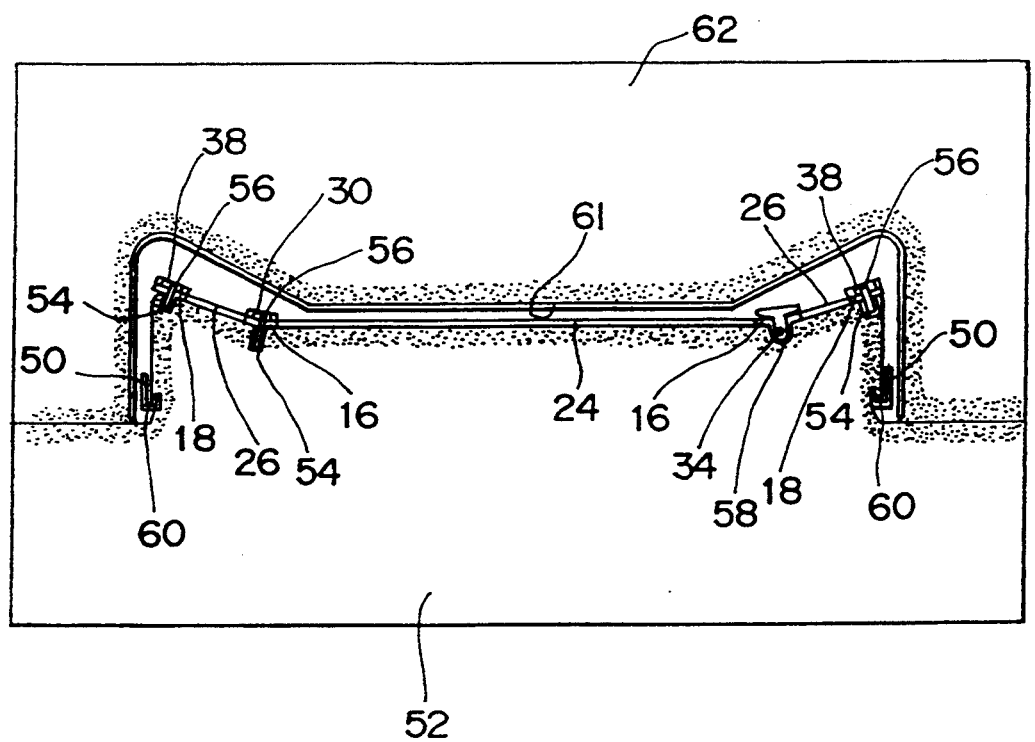
FIG. 5 is a cross-sectional view showing a mold which forms the cushion member for the vehicle seat according to the present invention.

As shown in FIG. 2, the holder plate 16 is bent at its center line, which is the longitudinal axis of the holder plate 16, and directed upwardly toward the holder plate 18. On the upper surface of the holder plate 16, bosses 30 are vertically provided at predetermined intervals. The bosses 30 fit into circular holes 31 formed in the holder cover 20, thereby allowing both end portions of the elastic fibers 24 and 26 to be held between the holder plate 16 and the holder cover 20. In each of the bosses 30, a through hole 32 is formed into which a positioning pin 56 mounted in an upper mold 52 is inserted, as shown in FIG. 5. The holder cover 20 has hooking members 34 provided downwardly for insertion into and through holes 36 formed in the holder plate 16 so as to protrude from the lower surface of the holder plate 16. Similarly, on the holder plate 18 and in the holder cover 22, bosses 38 and circular holes 40 are respectively formed for holding end portions of the elastic fibers 26 therein.

Figure 3:
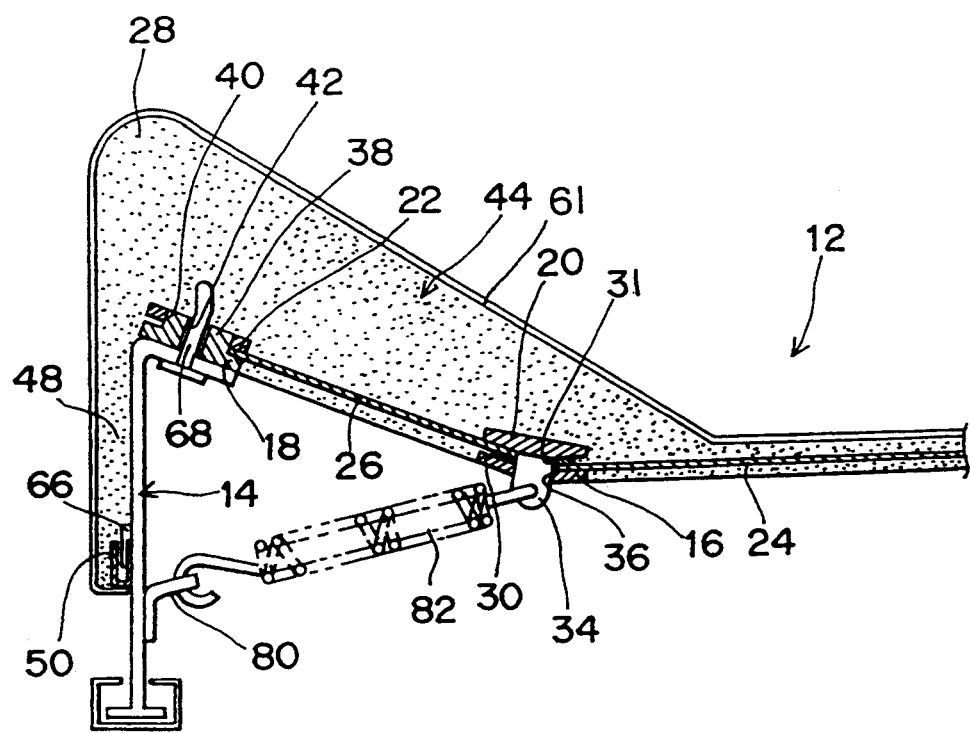
FIG. 3 is a cross-sectional view as seen from the left of a cushion member for the vehicle seat according to the present invention.
Figure 4:
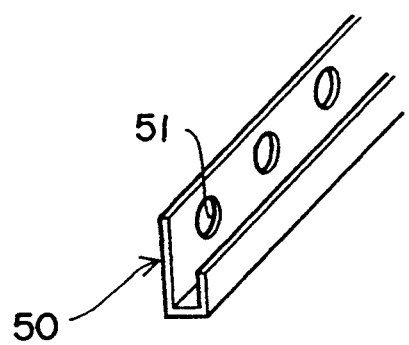
FIG. 4 is a perspective view showing a side holder.

The elastic fibers 24 and 26 use porous polypropylene or polyester fibers to permit continual use as an elastic material and to prolong life cycle of the elastic fibers 24 and 26 because of reduced creeps. As shown in FIG. 3, a urethane pad 44 forms the banked portion 28 rising toward the holder plate 18, which is disposed outwardly at an upper portion of the holder plate 16 constituting the cushion member 12. The urethane pad 44 further forms a side portion 48 which bends downwardly from the banked portion 28. At an end portion of the side portion 48, a side holder 50 is provided so as to mount the cushion member 12 onto a seat frame 14 fixed to a vehicle body. As illustrated in FIG. 4, the side holder 50 has a substantially U-shaped cross-section, with circular holes 51 formed in its side surface at predetermined intervals. When urethane foam is injected, the circular holes 51 have a provision whereby the urethane foam enters therein so as to secure the side holder 50 to the end portion of the side portion 48 of the cushion member 12.

Method for Producing the Cushion Member

A method for producing a cushion member will now be described with reference to FIG. 5.

As a first step, holder plates 16 and 18 are fixed to a upper mold 52 into which the shape of a cushion member 12 is impressed. The upper mold 52 is provided with holes 54 punched for positioning. Into the holes 54, positioning pins 56 are anchored so as to fit into through-holes 32 and 42 of bosses 30 and 38 respectively. A side holder 50 is fixed to a groove 60 formed in each side surface portion of the upper mold 52.

Subsequently, elastic fibers 24 and 26 are wound around the bosses 30 and 38 to form a seat surface and elastic suspending means. A method will now be given for spanning the elastic fibers 24 and 26. As illustrated in FIG. 2, one end portions of the elastic fibers 26 are first wound around the bosses 38 of the holder plate 18 in spiral fashion. The end portions thereof are extended through circular holes 40 of the holder cover 22. The end portions of the elastic fibers 26 are thereby held between the holder cover 22 and the holder plate 18. Deflections are thereby eliminated. Next, the elastic fibers 26 are spanned between and wound around the bosses 38 and 30 in the transverse direction of a vehicle. The other elastic fibers 24 are then wound between the bosses 30 disposed in the lateral direction of the vehicle seat 10. (See FIG. 5.) Similarly, this spanning operation is also performed in the longitudinal direction of the vehicle, whereby a net-shaped seat surface is formed. When the spanning operation is completed, the holder covers 20 and 22 are fitted into the respective holder plates 16 and 18 so as to rigidly secure the end portions of the elastic fibers 24 and 26 therebetween. The elastic fibers 24 and 26 are thus securely anchored at a given pitch by both the holder covers 20 and 22 and the holder plates 16 and 18 so that variations in seat pressure distribution due to the misalignment of the windings are prevented. Because the spanning operation is simple, thereby allowing the use of robots or the like in the course of assembling work to achieve a labor saving. Furthermore, the breaking of the elastic fibers 24 and 26 caused by intensive, localized stress can be prevented because the contact surfaces of the elastic fibers 24 and 26 extend around the side surfaces of the bosses 30 and 38.

In addition, the elastic fibers 26 spanned between the bosses 38 and 30 are separated from the elastic fibers 24 spanned between the bosses 30 disposed in the lateral direction of a vehicle seat 10.

After the above spanning operation is completed, a urethane cover 61 is either sprayed or pasted over a lower mold 62. Urethane foam is then charged to effect mold-matching of the upper and lower molds 52 and 62. Thereafter, the urethane foam is expanded, and the molds are released after a predetermined period of time (for ten minutes at 60° C. in this embodiment). The cushion member 12 fitted within the upper mold 52 are removed therefrom, and production work is now completed. As can be seen from the above description, in the method for producing the cushion member 12 according to this embodiment, the upper and lower molds 52 and 62 alone can be used to form the cushion member 12, thereby allowing for fewer components and a shorter manufacturing process. Furthermore, this allows for both lighter weight and a smaller-sized design of the cushion member 12, thereby providing a wider space within the vehicle.

Cushion Member Installation Work

Figure 6:
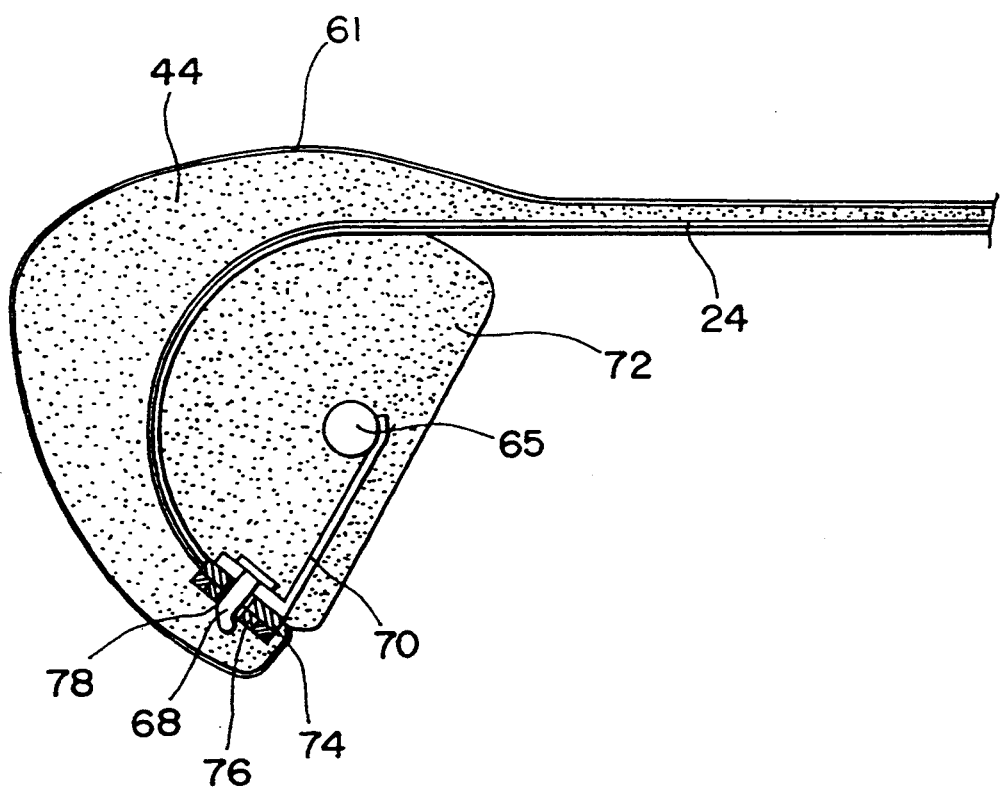
FIG. 6 is a cross-sectional view taken along a longitudinal axis of a vehicle, illustrating an end portion of the cushion member for the vehicle seat according to the present invention.

As shown in FIG. 1, fixing pins 64 are provided on a seat frame 14 which is fixed to a vehicle body (not shown). These pins 64 are fitted into holes 42 formed in bosses 38 of holder plates 18 so as to mount a cushion member 12 onto the seat frame 14. At the same time, a side holder 50 is interlocked with each L-shaped hook 66 provided on side portions of the seat frame 14. (See FIG. 3.) As illustrated in FIG. 6, in the longitudinal direction of a vehicle, there is an axis 65 disposed in the transverse direction of the seat frame 14, and a cross member 70 is connected to the axis 65 and is equipped with fixing pins 68. The axis 65 and the cross member 70 are covered by a urethane pad 72 having an elliptical cross-section. The fixing pins 68 are fitted into holes 78 formed in bosses 76 of a holder plate 74 disposed in the transverse direction, whereby a position of the seat frame 14 in the longitudinal direction thereof is assumed.

Thereafter, a hooking member 34 and a stopper portion 80 are connected to one another via a spring 82, as shown in FIG. 3. The mounting operation of the vehicle seat 10 is now completed.

As can be seen from the above description, mounting is completed by only fitting the cushion member 12 into the seat frame 14, thereby allowing for fewer mounting processes. In addition, initial tension is imparted to elastic fibers 24 by the springs 82, thereby eliminating initial downwardly deflections. Furthermore, the hooking members 34 of the holder covers 20 are pulled downward by the springs 82, thereby preventing the 1 if ting-off of the holder covers 20 due to forces acting on the end portions of the elastic fibers 24 when the vehicle seat 10 is used. The end portions of the elastic fibers 24 are securely fixed, thereby eliminating the chance that the holder covers 20 and the holder plates 16 break loose from one another.

Deflection Characteristics of the Cushion Member

Figure 7:
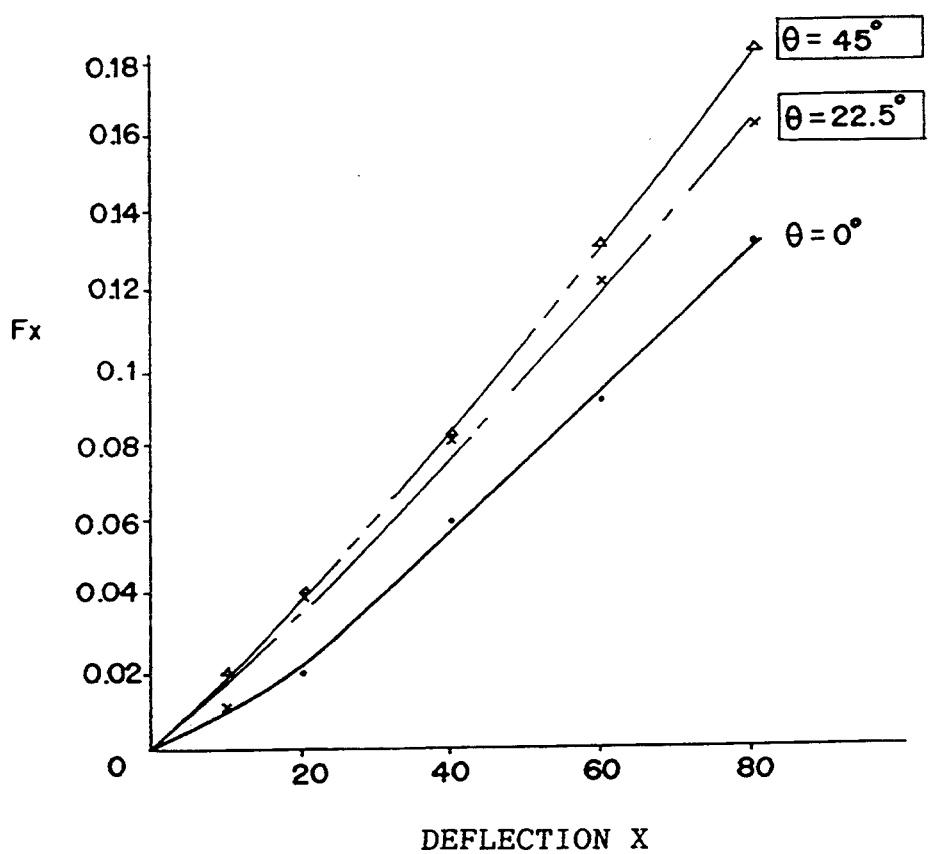
FIG. 7 is a graph illustrating a deflection curve showing a deflection characteristic of the elastic fibers.

FIG. 7 shows experimental values in which a deflection curve of a single elastic fiber 24 varies according to a tensile force in the upper-diagonal direction imparted to both end portions of the elastic fiber 24 forming a seat surface.

Figure 8:
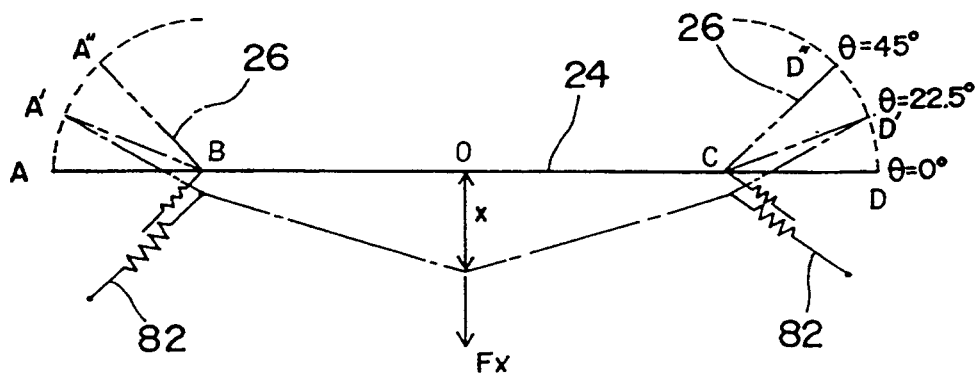
FIG. 8 is a schematic illustration showing a state in which end portions of the elastic fibers are supported.

As illustrated in FIG. 8, point 0 at the center between points B and C receives load $F_x$. At this time, the positions of points A and D supporting both end portions of the elastic fiber 24 are graded upwardly from 0° to 45° through 22.5° in relation to straight line B-C. Furthermore, points B and C are influenced by tensile forces in the lower-diagonal direction, which are caused by springs.

As can be judged from FIG. 7, when the elastic fiber 24 is spanned in a flat plane, i.e. , points A and D are at an angle of 0°, the initial deflection X given is large, thus resulting in a non-linear deflection curve. As load $F_x$ further increases, the deflection curve gradually approaches a straight line. When a vehicle seat 10 in which the elastic fibers 24 have a deflection curve as drawn in the above manner is employed, a momentary sense of softness is felt when an occupant is seated, and a so-called feeling of sitting-on-the-bottom occurs as occupant's weight is applied.

When points A and D are at an angle of 22.5° and 45° respectively, substantially linear deflection curves are drawn. This means that the amount of deflection increases at a given ratio. Accordingly, an occupant has no feeling of sitting-on-the-bottom when seated in the vehicle seat 10 in which the elastic fibers 24 having the deflection curve as drawn in the above manner are employed.

Figure 9:
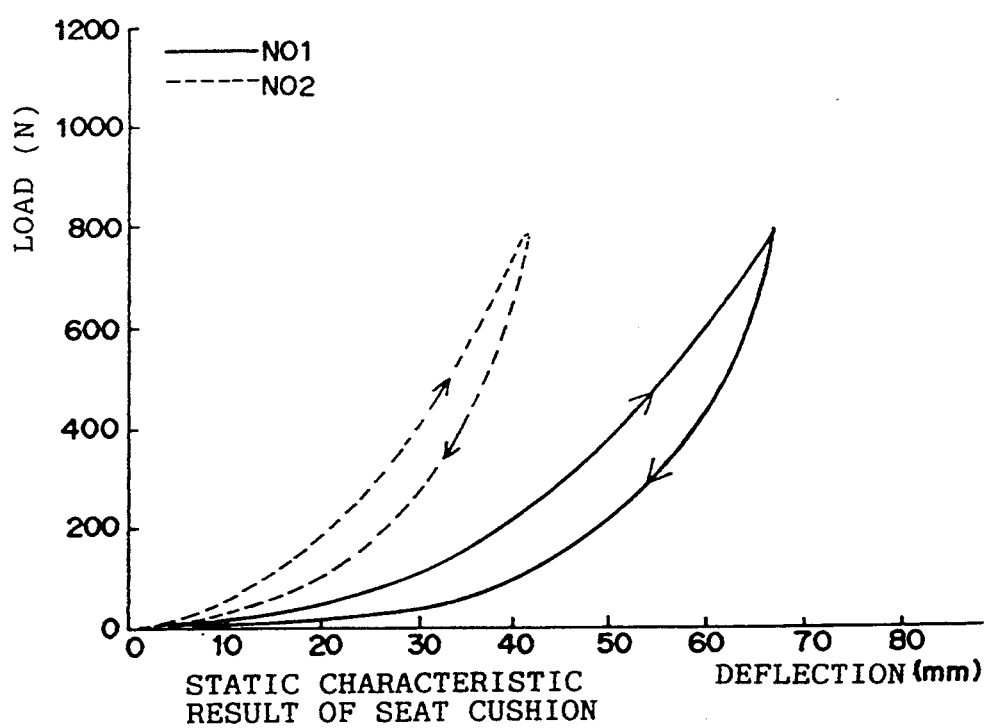
FIG. 9 is a graph illustrating cushion characteristics of the cushion member for the vehicle seat.

FIG. 9 shows one hysteresis loop of a cushion member 12 in which the elastic fibers are spanned in a flat plane (solid line), and another hysteresis loop of the cushion member 12 in which those fibers are spanned between points A and D at an angle of 22.5° (dashed line).

As can be determined from this graph, the hysteresis loop drawn in accordance with the cushion member 12 (the dashed line) of the present embodiment is closer to a linear state when compared with the solid line. Accordingly, a cushion member producing no feeling of sitting-on-the-bottom is achievable.

Figure 10:
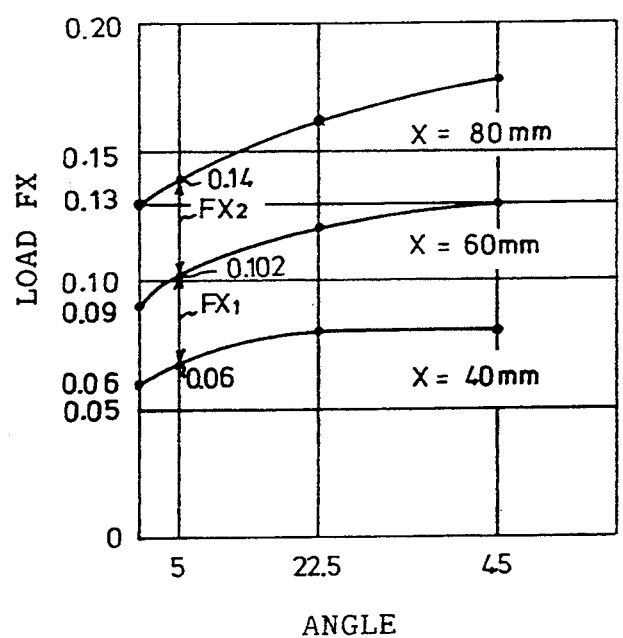
FIG. 10 is a graph illustrating critical values for each support angle of the end portions of the elastic fibers.
Figure 11:
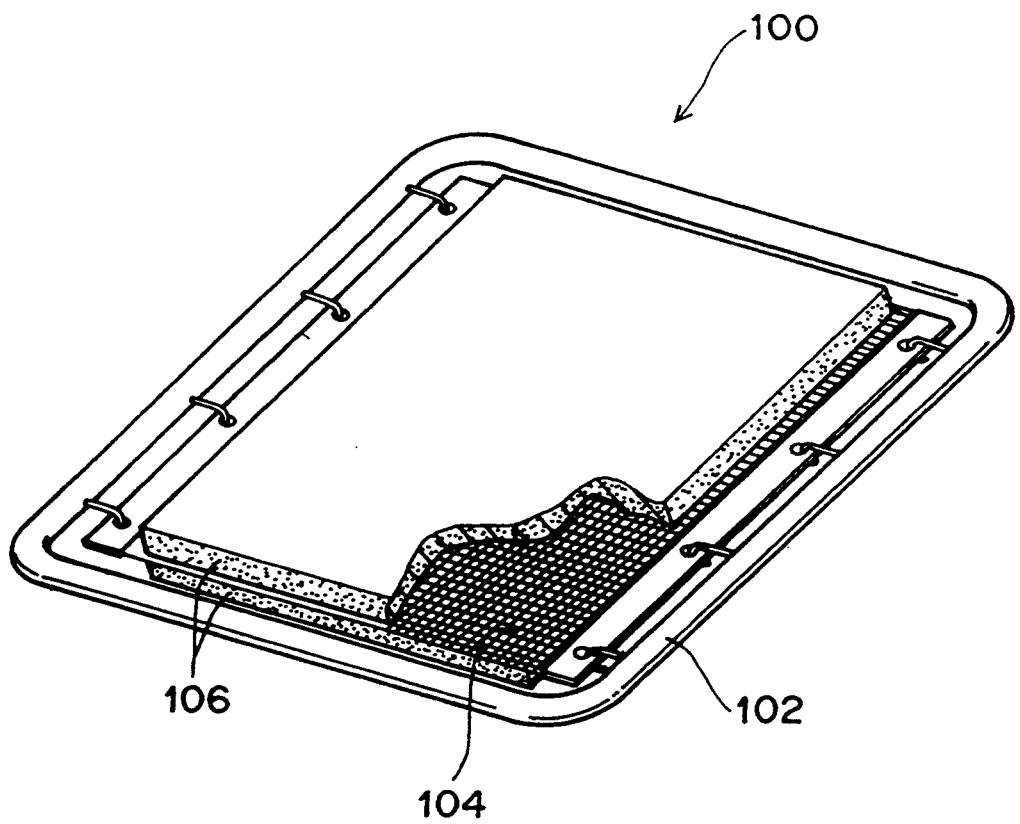
FIG. 11 is a perspective view showing a conventional vehicle seat.

FIG. 10 shows a graph illustrating results from experiments to determine a critical point, at which the degree of each angle for points A and D must be established in order to secure benefits from the present invention.

On the basis of experimental results in FIG. 10, it can be determined that the optimum cushion characteristics are obtained when points A and D are at angles of about 5° each. That is, when points A and D are at an angle of 0°, load $F_x$, where corresponding deflection X is 40 mm, 60 mm, and 80 mm, is now given 0.05 kg, 0.09 kg, and 0.13 kg. As a result, $F_{x1} \neq F_{x2}$, indicates a non-linear deflection curve. When points A and D are each at an angle of 5°, the result is that 0.068 kg, 0.102 kg, and 0.14 kg, and $F_{x1} \approx F_{x2}$. This indicates a substantially constant variation in deflection X in relation to load $F_x$, i.e., a substantially linear deflection curve. It can thereby be determined that proper critical value is five degrees and more preferably ten degrees or greater so as to attain benefits from the present invention.

With the cushion member 12 according to this embodiment, although the elastic fibers 24 are wound an equal number of times, cushion characteristics adapted for the bodily shape of each occupant can readily be provided by an increased or decreased number of times of winding.

An aeratable cushion member as high as 200 to 300 ml/cm$^2$/s can be provided by mesh-shaped grooves cut in the surface of the cushion member 12 along the elastic fibers 24, while permeability in conventional urethane pads is 30 ml/cm$^2$/s.

Furthermore, with a covering material 61 being made of urethane elastomers and the like, the cushion member 12 is washable because it is easy of loading and unloading.

What is claimed is:

1. A vehicle seat comprising:
   a holder assembly including at least two holder segments and defining a seat surface for an occupant;
   an elastic material secured to said holder assembly so as to span at least between said holder segments;
   a suspending assembly that suspends at least one of said holder assembly and said elastic material from above and outside said holder assembly relative to said seat surface;
   a tensioning assembly that strains said holder assembly with a predetermined tensile force from a central portion of at least one of said holder segments in a direction downwardly and outwardly relative to said seat surface.

2. A vehicle seat according to claim 1, further comprising an elastic pad that integrally overlays said holder assembly, said elastic material, and said suspending assembly.

3. A vehicle seat according to claim 1, wherein said elastic material comprises elastic fibers spanned between said holder segments in the form of a net, thereby forming said seat surface.

4. A vehicle seat according to claim 1, wherein said elastic material comprises one of polypropylene and polyester fibers.

5. A vehicle seat according to claim 1, wherein said suspending assembly comprises an outer frame, which is disposed on an outer periphery of said holder assembly, and an elastic element which extends between said holder assembly and said outer frame, said outer frame comprising: a hole plate which is provided with a cylindrical boss about which an end portion of said elastic element is wound; and a holder cover having a circular hole for receiving said boss, said holder plate being mounted to said holder cover, whereby said elastic element end portion wound onto said boss is held between said holder plate and said holder cover.

6. A vehicle seat according to claim 2, wherein said elastic pad is urethane pad; and further comprising: a side holder which is disposed at the lower portion of a side surface of said urethane pad, said side holder being formed with a circular hole through which urethane foam enters forming said urethane pad, and said side holder being held against a hook provided on a side portion of a seat frame fixed to a vehicle body.

7. A vehicle seat according to claim 6, wherein a fixing pin provided on said seat frame is fitted into a hole formed in said boss of said outer frame, for positioning a cushion member on which an occupant sits.

8. A vehicle seat according to claim 6, wherein a covering material for said cushion member is formed of urethane elastomers.

9. A vehicle seat according to claim 2, wherein said tensioning assembly comprises a hook protruding downward from said holder segment and a spring of which one end portion is connected to said hook while the other end portion thereof is connected to a lower portion of said seat frame.

10. A vehicle seat comprising:
    a holding system comprising holding members which form a seat surface for an occupant;
    an outer frame which is disposed on an outer periphery of said holding system;
    at least one elastic strap spanned between said holding members;
    a suspending assembly that elastically suspends said holding members from above and outside said holding system relative to said seat surface; and
    a spring assembly that strains said holding members with a predetermined tensile force in a direction downwardly and outwardly relative to said seat surface formed by said holding members.

11. A vehicle seat according to claim 10, wherein an extension line of a said elastic strap spanned between said holding members forms an angle of 5° or greater with a said elastic strap that is spanned between said holding system and said outer frame.

12. A vehicle seat according to claim 10, wherein said holding members and said outer frame each comprise a combination of a holder plate and a holder cover, one of said holder plate and said holder cover being provided with more than one boss having a cylindrical shape which protrudes toward the other of said holder plate and said holder cover, while the other of said holder plate and said holder cover is formed with holes which receive said bosses.

13. A vehicle seat according to claim 12, wherein a said elastic strap is wound around each of said bosses, thereby fixing said elastic straps thereto.

14. A vehicle seat according to claim 13, wherein said holder plate of said holding member is provided with a through hole punched therein, said holder cover of said holding member is provided with a hooking member that enters through said through hole, and said hooking member holding a spring which strains said holding member with a predetermined tensile force from a central portion of said holding member in said downward and outward direction.

15. A vehicle seat according to claim 10, further comprising an elastic pad that integrally overlays said holding members, said outer frame, and said at least one elastic strap.

16. A vehicle seat according to claim 10, wherein said at least one elastic strap comprises one of polypropylene and polyester fibers.

* * * * *